(12) United States Patent
Muschett et al.

(10) Patent No.: US 7,739,589 B2
(45) Date of Patent: Jun. 15, 2010

(54) EXTENDING MARKUP OF A BROWSER USING A PLUG-IN FRAMEWORK

(75) Inventors: Brien H. Muschett, Palm Beach Gardens, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1250 days.

(21) Appl. No.: 11/266,621

(22) Filed: Nov. 2, 2005

(65) Prior Publication Data
US 2007/0101322 A1    May 3, 2007

(51) Int. Cl.
G06F 17/21    (2006.01)
(52) U.S. Cl. .................................. 715/234; 715/200
(58) Field of Classification Search ................. 715/513, 715/234
See application file for complete search history.

(56) References Cited

U.S. PATENT DOCUMENTS

| | | | |
|---|---|---|---|
| 5,787,254 A | 7/1998 | Maddalozzo, Jr. et al. | |
| 6,477,550 B1 * | 11/2002 | Balasubramaniam et al. | 715/234 |
| 6,766,356 B1 | 7/2004 | Krautter | |
| 6,784,900 B1 | 8/2004 | Dobronsky et al. | |
| 6,792,575 B1 | 9/2004 | Samaniego et al. | |
| 6,857,124 B1 * | 2/2005 | Doyle | 719/316 |
| 7,424,717 B2 * | 9/2008 | Blevins | 719/318 |
| 2002/0169806 A1 * | 11/2002 | Wang et al. | 707/541 |
| 2003/0126311 A1 | 7/2003 | Kushnirskiy et al. | |
| 2003/0184582 A1 | 10/2003 | Cohen | |
| 2004/0167928 A1 | 8/2004 | Anderson et al. | |
| 2004/0177327 A1 | 9/2004 | Kieffer | |
| 2004/0254832 A1 | 12/2004 | Harkin | |
| 2004/0258089 A1 | 12/2004 | Derechin et al. | |

FOREIGN PATENT DOCUMENTS

WO    00/05643 A1    2/2000

OTHER PUBLICATIONS

Sheng, C., et al., "XML Based Web Control," Apr. 29, 2004.

* cited by examiner

*Primary Examiner*—Doug Hutton
*Assistant Examiner*—Tionna Smith
(74) *Attorney, Agent, or Firm*—Patents on Demand, P.A.; Brian K. Buchheit

(57) ABSTRACT

A method for extending markup supported by a browser can include a step of identifying a browser that presents information written in a markup language. An extender can be identified that includes at least one extension to the markup language that the browser does not normally support. The extender can be loaded resulting in the markup language supported by the browser being extended to include the extension.

18 Claims, 2 Drawing Sheets

EXTENDING MARKUP OF A BROWSER USING A PLUG-IN FRAMEWORK

BACKGROUND

1. Field of the Invention

The present invention relates to the field of browser design and, more particularly, to a browser that uses a plug-in framework to extend a supported markup language.

2. Description of the Related Art

A browser is a program that audibly or visually renders documents based upon a markup language. A common type of browser is a Web browser that renders hypertext-markup language (HTML) based documents. HTML documents are often served by a Web server to clients over a network utilizing a packet based protocol. As used herein, the term HTML based document is used generally to refer to any document based on markup languages derived from HTML, such as an Extensible Markup Language (XML) document, a Voice extensible Markup Language (VoiceXML) document, a WML document, and the like.

Conventional Web browsers are able to utilize Web plug-ins, which are small pieces of code that extend a Web browser. Conventional plug-ins allow users of the Web browser to view media types other than HTML and images. There are hundreds of plug-ins that enable Web users to use a plethora of multimedia formats, including audio and video. Common examples of Web plug-ins include flash plug-ins for enabling MACROMEDIA FLASH objects, JAVA plug-ins, and portable document format (PDF) plug-ins for permitting browser users to view and manipulate PDF based documents within a browser.

Conventional browsers and browser plug-ins fail to extend the markup language supported by the markup browser. Instead, conventional markup plug-ins are based upon standard HTML documents and standard markup language constraints. Consequently, plug-in designers often construct complex scripts, JAVA applets, or use the <object> markup tag in an attempt to compensate for a lack of a desired markup language extension. Because every mainstream browser has browser specific idiosyncrasies, designers must conduct exhaustive script testing against different browsers. It is typical for a plug-in to first identify a browser that the plug-in is executing within and then to execute different code depending on the browser being used.

Another alternative that is used by developers to extend a markup language is to require users to use a proprietary browser, specifically designed to include a markup extension. Constructing a proprietary browser is a complex and costly task, especially when the desired feature or language extension is for a relatively minor, yet significant, feature. Additionally, reliance upon proprietary browsers greatly limits the marketability of a product. Consumers want to use a Web browser with which they are familiar that has been customized to their preferences and are reluctant to adopt a proprietary browser, especially when that browser is only used to access information from a single content source.

What is needed is a mechanism for extending a markup language so that new tags, language features, and the like can be specified and used without requiring browser source code to be modified. Such a mechanism would allow developers to more easily construct markup applications. For instance, designers could extend the markup language using the proposed mechanism instead of relying upon "work arounds" based upon language constrained scripts.

The proposed mechanism could also be used to enhance a user's browsing experience. For instance, using the mechanism to extend a browser's supported markup language would result in integrated extensions that more closely conform to user perceived "standards."

To illustrate, users commonly are confused when viewing PDF documents within a browser because buttons and features specific to the "PDF" plug-in must be used instead of standard browser buttons and features. For example, the find, copy, cut, and paste features of the browser are not enabled for a PDF document contained within a browser that uses a standard PDF plug-in. Instead, plug-in specific buttons and functions must be used/selected by a user wanted to perform functions, such as find, copy, cut, and paste. Implementing plug-ins in a fashion that prevents users from using browser buttons/functions results in user confusion and frustration. No known solutions permit developers to extend a browser's supported markup language at runtime.

SUMMARY OF THE INVENTION

A system and method for extending markup of a browser via a plug-in framework in accordance with an embodiment of the inventive arrangements disclosed herein. More specifically, a browser that supports a defined markup language can load one or more packages containing language extensions. The extensions can represent a modification of an existing browser functionality or a new browser functionality. The loaded language extensions can be linked to the browser so that the browser can interpret markup that utilizes the language extension. The linking of the language extension can occur in multiple fashions. The language extensions can, for example, modify a schema, document type definition (DTD), and/or a Document Object Model (DOM) associated with markup being rendered by the browser. Regardless of how the linking is implemented, the browser language extensions can be implemented in a standardized, browser independent manner that permits third party venders to construct packages including markup language extensions. Users can utilize those extension packages within a browser of their choice.

The present invention can be implemented in accordance with numerous aspects consistent with material presented herein. For example, one aspect of the present invention can include a method for extending markup supported by a browser. The method can include the step of identifying a browser that presents information written in a markup language. An extender can be identified that includes at least one extension to the markup language that the browser does not normally support. The extender can be loaded resulting in the markup language supported by the browser being extended to include the extension.

Another aspect of the present invention, can include a browser. The browser can include a means for presenting information written in a markup language. The browser can be a Web browser, a voice browser, and/or a multi-modal browser. An implementation of a plug-in framework can be included in the browser. A means for utilizing plug-in packages in compliance with the plug-in framework can also be included in the browser. Each of the plug-in packages can extend the markup language supported by the browser without altering source code of the browser.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
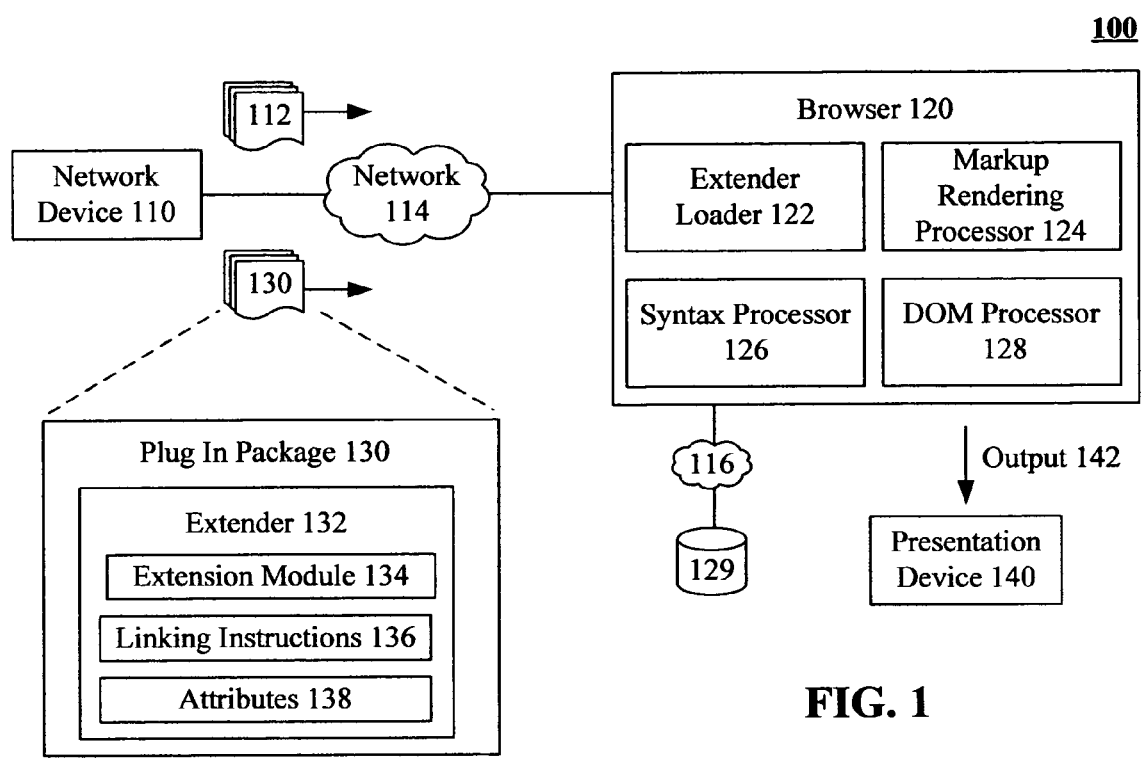
FIG. 1 is a schematic diagram illustrating a system including a browser configured with an ability to extend its supported markup language in accordance with an embodiment of the inventive arrangements disclosed herein.

FIG. 1 is a schematic diagram illustrating a system 100 including a browser configured with an ability to extend its supported markup language in accordance with an embodiment of the inventive arrangements disclosed herein. System 100 can include network device 110, presentation device 140, and browser 120.

The network device 110 can be any device that conveys either a markup document 112 or a plug-in package 130 to browser 120 via network 114. Network device 110 can be a physical network device, a set of distributed but functionally related devices, a virtual computing device, and the like. In one embodiment, network device 110 can represent a Web server that provides markup documents 112 responsive to Hyper Text Transfer Protocol (HTTP) based requests. Network device 100 can also include a File Transfer Protocol (FTP) server that conveys one or more plug-in packages 130 to browser 120. The present invention is not to be construed as limited to any particular data conveyance protocol and use of any Transmission Control Protocol/Internet Protocol (TCP/IP) based protocol or alternative transport protocol is contemplated herein.

Markup document 112 and a plug-in package 130 can be conveyed from the same network device 110 and/or can be conveyed by different network devices 110. In one embodiment, the markup document 112 can be conveyed at approximately the same time as an associated plug-in package 130. In another embodiment, markup document 112 can be conveyed before or after an associated plug-in package 130 is conveyed.

For example, a plug-in package 130 associated with markup document 112 and required by browser 120 to render markup document 112 can be conveyed to and loaded within browser 120 when the browser 120 is loaded or instantiated. In another example, a markup document 112 can be conveyed to browser 120, browser 120 can determine a need for associated plug-in package 130 before rendering markup document 112, and the plug-in package 130 can be automatically or interactively acquired responsive to the determined need.

Markup document 112 refers to an electronic document written in accordance with a markup language that describes the structure and appearance of a document. Markup document 112 can be a document that includes markup tags that describe platform independent styles that specify how the content of the markup document 112 is to be rendered.

Markup document 112 can include any Standard Generalized Mark-Up Language (SGML) based document that includes documents based upon derivatives, subsets, and supersets of SGML. For example, markup document 112 can include, but is not limited to, a Hypertext Markup Language (HTML) markup document, an eXtensible Markup Language (XML) markup document, a Wireless Markup Language (WML) document, a Voice extensible Markup Language (VoiceXML) document, and the like.

Plug-in package 130 refers to an electronic message that defines a markup language extension. A plug-in package 130 can define a markup language extension not normally supported by the browser 120. The browser 120 can load plug-in-package 130, extract the necessary information about the specified extension, and can thereafter handle markup documents 112 in accordance with the package 130 specifications. The loading of a package 130 can occur dynamically at runtime. Package 130 can comply with a standardized framework defined for extending browsers. Consequently, package 130 can be implemented in a browser independent fashion, assuming that a browser to be utilized complies with the standards specified for the standardized framework.

Plug-in package 130 can include one or more extenders 132. An extender 132 is a set of machine readable instructions that are associated with a markup language. Extender 132 can define a new language tag, attribute, property, or object that was not previously part of a markup language supported by browser 120. Extender 132 can also define a replacement functionality or functionality implementation for an existing functionality of browser 120.

Extender 132 can include an extension module 134, a set of linking instructions 136, and/or attributes 138. The extension module 134 can include code that is use to handle a defined markup function. The linking instructions 136 can specify the manner in which browser 120 is to link to the extension module 134. Linking instructions 136 can specify one or more manner in which the extension module 134 is to be linked to the browser 120. Linkages can include, for example, a document type definition (DTD) linkage, a schema linkage, a Document Object Model (DOM) linkage, and/or other linkages.

Browser 120 can include a software application hosted upon a computing device capable of producing output 142 based upon markup document 112. Output 142 can be presented upon presentation device 142. Browser 120 can include a means for presenting information written in a markup language, where the presenting means can include visual and/or audio information.

For example, browser 120 can be a Web browser that visually presents markup document 112 upon presentation device 140. Browser 120 can also be a voice browser that generates audio output 142 that is presented upon presentation device 140.

It should be appreciated that technologies for using browser 120 to visually and/or audibly present information base upon markup document 112 is well known in the art. The presentation means used by the browser 120 includes any and all known presentation technologies.

Browser 120 can include extension loader 122, markup rendering processor 124, syntax processor 126, and DOM processor 128. Extension loader 122 can load plug-in package 130. Extension loader 122 can link or attach extension module 132 to browser 120 in accordance with linking instructions 136 and attributes 138.

In one embodiment, the extension loader 122 can place extension modules 134 in a data store 129. Data store 129 can be located in a storage space local to browse 120 or can be located in a storage space remotely located from browser 120. When remotely located, data store 129 can be accessed via network 116.

The extension loader 122 can load extender 132 at runtime. Attributes 138 can specify various times at which the extension loader 122 is to load an extender 132. For example, the extender 132 can be loaded when browser 120 loads, when markup document 112 is parsed, when markup document 112 is rendered, when DOM events occur, and the like.

The markup rendering processor 124 can be the runtime processor that renders or interprets markup document 112. The markup rendering processor 124 can utilize syntax processor 126 and/or DOM processor 128. Software hooks to extension module 134 can be included within suitable locations of the mark rendering processor 124.

Syntax processor 126 can include a list of the elements, attributes, comments, notes, and entities contained in the markup document 112, as well as their relationships to one another. In one embodiment, syntax processor 126 can be Document Type Definition (DTD) processor where the structure and rules for markup document 112 are defined by a DTD. The syntax processor 126 can also be an XML schema processor that defines structure and rules using XML code contained within markup document 112.

The syntax processor 126 can possess an ability to dynamically generate a DTD or schema For example, the linking instructions 136 can include DTD snippets isolated in functionality to the extender 132. The snippets can be automatically and dynamically added at runtime to pre-existing, static DTD instructions. That is, the syntax processor 126 can produce an operational DTD to be used in parsing markup document 112 based upon linking instructions 136.

DOM processor 128, can process structured documents conforming to the official World Wide Web Consortium (W3C) standard for representing structured documents in a platform and language neutral manner. In one embodiment, the extender 132 can be hooked into the DOM API of markup document 112. The DOM processor 128 can create DOM event handlers, which are triggered within the DOM. In one embodiment, this can be accomplished though a DOM node method "addEventHandler". For example, to handle processing of a new tag defined by extender 132, a DOM event for that tag can be created, the DOM event handler can then be added to the DOM node.

Presentation device 140 can be any device capable of presenting output 142. In one embodiment, presentation device 142 can be a client device upon which a browser 120 executes. For example, presentation device 142 can include a computer, a personal data assistant (PDA), a tablet computer, and a smart phone. Presentation device 120 can also be a telephone device that presents audible output generated by a voice browser.

Network 116 and network 140 can be configured to permit the conveyance of data that is encoded in a carrier wave. Network 116 and network 140 can include one or more local area networks, wide area networks, metropolitan area networks, and the like. Network 116 and network 140 can also include packet based components and circuit based components. Network 116 and network 140 can include wireless as well as line based communication pathways.

Further, network 116 and network 140 can include computing components communicatively linking devices comprising a single machine to each other. Network 116 and network 140 can also include components communicatively linking devices functioning as a virtual machine or as a distributed computing device to one another. Network 116 and network 140 can further include components and computing devices linking two or more remotely located computing devices to each other through a network based communication protocol, such as a Transmission Control Protocol/Internet Protocol (TCP/IP) network protocol.

Interaction among the components of system 100 can be clarified through an example as follows. It should be appreciated that the following example is for illustrative purposes only and that the invention should not be construed as limited to the specific arrangements used within. In the example, Web browser 120 can access a Web server (network device 110) to retrieve a markup document 112. The markup document 112 can include a new markup language tag called <data>, as shown below.

```
<html>
    <head> <title>Markup Extension Application</title> </head>
        <body>
            <p>This is a sample application using markup extensions
            ...
            <data uri="http://myserver.domain/myservlet"
                namelist="var1 var2 var3 var"/>
            ...
        </body>
</html>
```

Code Illustration 1

Sample HTML Document with Data Tag

The data tag can provide an ability to send a message to a remote server, without causing a reload of an HTML page (which occurs when the "submit" tag is used). The <data> tag can include attributes of "uri" and "namelist," where "uri" specifies a location for pushing data and "namelist" provides a list of variables to send over with a request.

A plug-in package 130 can include extender 132 for implementing the <data> tag. The plug-in package can include a descriptor as shown below. The illustrated descriptor utilizes JAVA archives (JARs) to package a DTD description, an extension point, a parse module, and a process module.

```
<?xml version="1.0" encoding="UTF-8"?>
    <vb_plugins version ="1.0">
        <plugin name="data">
            <dtd definition="jar:
                http://www.widgets.com/widges/vxml/data.jar!/data.dtd"
                extension_point="jar:http://www.widgets.com/widges/vxml/
                pause.jar!/insertdata.dtd">
            <parse_module uri="jar:
                http://www.widgets.com/widges/vxml/pause.jar!/parseModue
                .class"/>
            <process_module uri="jar:
                http://www.widgets.com/widges/vxml/pause.jar!/processMou
                le.class"/>
        </plugin>
    </vb_plugins>
```

Code Illustration 2

Sample Descriptor for Plug-in Package

Both the plug-in package 130 and the markup document 112 can be conveyed to browser 120 via network 114. Extender loader 122 can load the plug-in package 130 in the browser 120. Loading the Plug-in package can include establishing links for triggering the extension module 134. Extension module 134 can be loaded in data store 129. Extension module 134 can execute when a pointer referencing the extension module 134 is triggered by the markup rendering processor 124.

In one embodiment, the plug-in framework for browser 120 can require the DTD that represents the new markup to be defined. A DTD Snippet for the <data> feature is shown below.

<!ELEMENT html (data)*>

Code Illustration 3

DTD Snippet of for Data Extension

The DTD Snippet for the <data> extension can be automatically added at runtime to a static compliant markup DTD. The Syntax processor 126 can add the <data> extension to the markup DTD at runtime. That is, the syntax processor 126 can take a plug-in package 130 and can dynamically produce an operational DTD to be used in parsing the markup document 112.

In one embodiment, the plug-in framework for browser 120 can require the data extension to hook into the DOM API of markup document 112. The DOM processor 128 can create DOM event handlers, which are triggered within the DOM using a DOM Node method, such as "addEventHandler." An example DOM event handler for the <data> extension is shown below.

```
class DataPluginProcessing implements Event throws DOMException {
    void process (Document dom, Node me,
        EcmaScriptExecutionContext context, IntpreterContext IC) {
            long namelist = Long.parseLong (me.getAttribute
                ("namelist"));
                URI uri = new URI (me.getAttribute ("uri");
                if (uri != null) {
                    String namelistAsQueryString =
                    processNameList
                        (nameList,
                        EcmaScriptExecutionContext);
                        URL url = new URL (uri.toString( )
                        + "?" +
                        nameListAsQueryString);
                        uri.openConnection ( );
                        uri.connect ( );
                        // process stream, headers etc.
                    else
                        throw ProcessinException ("Illegal URI
                            value");}}}
```

Code Illustration 4

DOM Event Handler for Data Extension

It should be appreciated that DOM event handling is part of every browser implementation compliant with the DOM specification. Accordingly, adding an extension point as a DOM event enables seamless integration of the data extension in any DOM compliant browser.

Figure 2:
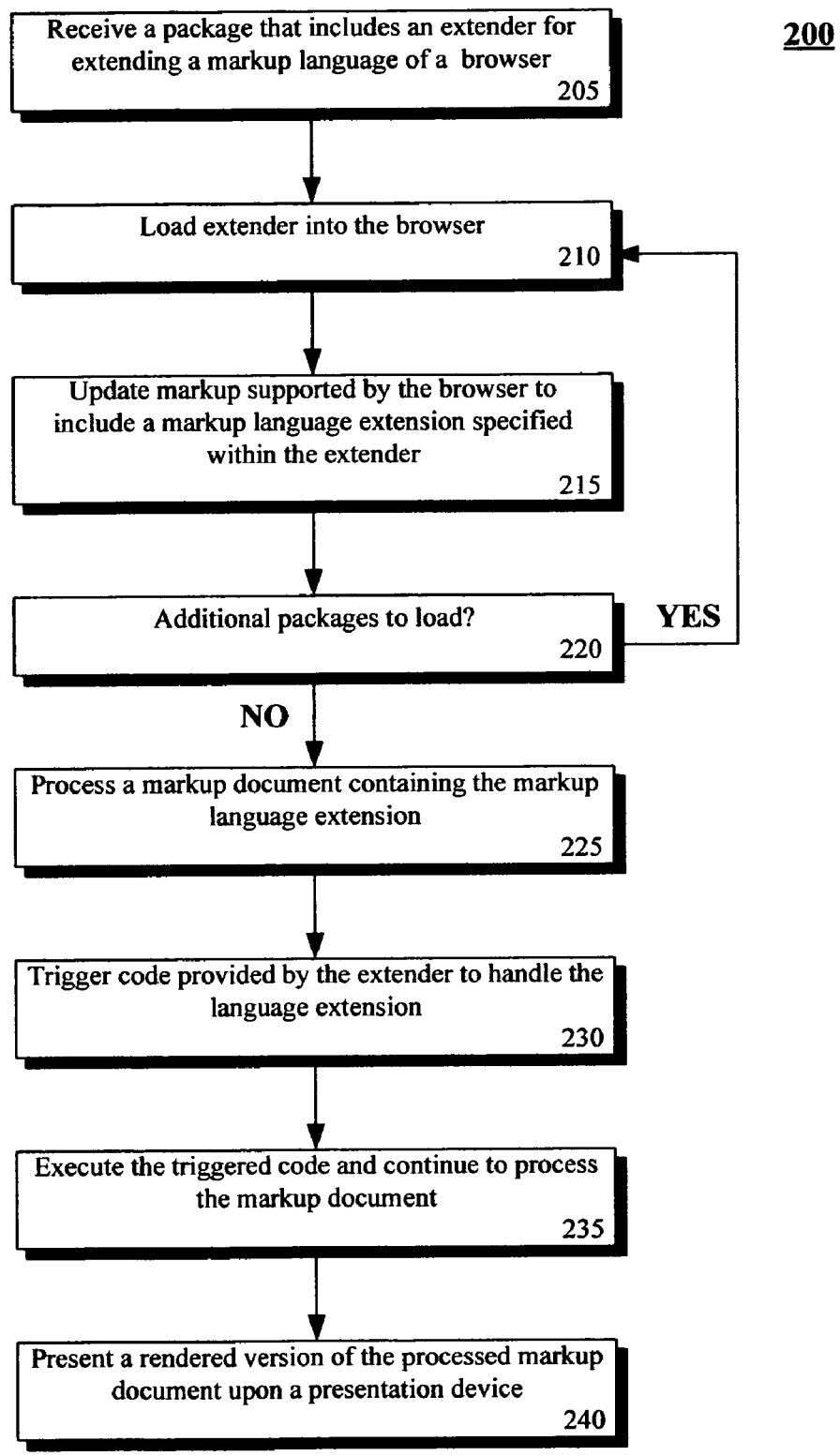
FIG. 2 is a flow chart of a method for extending markup language of a browser in accordance with an embodiment of the inventive arrangements disclosed herein.

FIG. 2 is a flow chart of a method 200 for extending markup language of a browser in accordance with an embodiment of the inventive arrangements disclosed herein. In one embodiment, method 200 can be performed in the context of system 100. Method 200 is not limited in this regard, however, and can be performed in the context of any browser having an extensible framework for extending a supported markup language at run time.

Method 200 can begin in step 205, where a browser can receive a package that includes an extender. The extender can specify a markup language extension for the browser. In step 210, the extender can be loaded into the browser. In step 215, the markup supported by the browser can be updated to include the markup language extension specified within the extender. In step 220, a determination can be made as to whether additional extension packages exist. Each extension package can include one or more extender. If extension packages exist, the method can loop from step 220 to step 210, where each package and included extender can be loaded in turn. Otherwise, the method can proceed from step 220 to step 225.

In step 225, a markup document containing the markup language extension can be processed by the browser. In step 230, code provided by the extender to handle the language extension can be triggered. In step 235, the triggered code can execute. After the extender provided code is executed, the markup document can continue to be processed in a normal fashion. If the extender provided code is executed at a location external to the browser, control can pass to the external code segment in step 230, the extender provided code can be executed in step 235, and then control can be passed back the browser.

In step 240, once the markup document has been processed, resulting output can be presented upon a presentation device. For example, when the browser is a Web browser and the presentation device a computer, the markup document can be visually rendered within a display of the computer. In another example, the browser can be a voice browser and the presentation device can be an audio device. An audio rendering of the markup can be played though an audio transceiver of the audio device.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for extending markup supported by a browser comprising:

identifying a Web browser that presents information written in a markup language, wherein said Web browser comprises a markup rendering processor that is a runtime processor that renders or interprets markup documents, and wherein said Web browser comprises a syntax processor that is a Document Type Definition (DTD) processor;

identifying an extender comprising an extension module and linking instructions, wherein the extension module defines a new language tag that was not previously part of a markup language supported by the Web browser;

loading the extender; and extending the markup language supported by the Web browser to include the new language tag, wherein the extending step further comprises:

the syntax processor using the extender to dynamically produce an operational DTD based upon the linking instructions, wherein said operational DTD is used by the Web browser in parsing a markup document that includes the new language tag;

wherein the identified extender further comprises a plurality of attributes, wherein said Web browser further comprises an extension loader for loading the extender at runtime, wherein the attributes of the extender define times at which the extension loader is to load the extender, wherein specifiable times via the attributes comprise at least two of "when the Web browser loads," "when a markup document is parsed," when a markup document is rendered," and when specified Document Object Model (DOM) events occur.

2. The method of claim 1, wherein said Web browser further comprises a Document Object Model (DOM) processor, said method further comprising:

said DOM processor creating a new DOM event for the new language tag defined in the extender.

3. The method of claim 1, wherein said extender is written and implemented in a Web browser independent fashion.

4. The method of claim 1, wherein said extending step occurs without altering source code of the Web browser.

5. The method of claim 1, wherein the extension includes a definition for new markup not previously part of the markup language, a definition of platform object, and a definition of platform properties.

6. The method of claim 1, wherein the extension replaces an existing functionality of the Web browser with a different implementation for the functionality.

7. The method of claim 1, further comprising:

defining a plug-in framework for the browser, wherein the extender is part of a plug-in package that complies with the plug-in framework, wherein the plug-in package comprises a code module of machine readable code for the at least one extension, and wherein the plug-in package comprises programmatic instructions for linking the code module to the Web browser.

8. The method of claim 1, further comprising:

identifying a different extender including at least one different extension to the markup language;

loading the different extender; and extending the markup language supported by the Web browser to include the different extension.

9. The method of claim 1, wherein said method loads a plurality of extensions and thereafter extends the markup language supported by the Web browser to include the plurality of extensions, wherein said loading of the plurality of extensions occurs at approximately the same time, and wherein said plurality of extensions comprise said at least one extension.

10. The method of claim 1, further comprising:

hooking at least one extension point into the Web browser in response to loading the extender; and loading the extension module including code for implementing said extension, wherein said extension point points to code of the extension module.

11. The method of claim 10, wherein said hooking step further comprises:

hooking the extension point into a Document Object Model (DOM) Application Program Interface (API).

12. The method of claim 1, further comprising:

adding an extension point defined by said extender as a Document Object Model (DOM) event, said extension point being used to execute code for the extension; and said Web browser triggering the DOM event.

13. A tangible machine-readable storage medium having stored thereon, a computer program having a plurality of code sections, said code sections executable by a machine for causing the machine to perform the steps of:

identifying a Web browser that presents information written in a markup language, wherein said Web browser comprises a markup rendering processor that is a runtime processor that renders or interprets markup documents and wherein said Web browser comprises a syntax processor that is a Document Type Definition (DTD) processor;

identifying an extender comprising an extension module and linking instructions, wherein the extension module defines a new language tag that was not previously part of a markup language supported by the Web browser;

loading the extender; and extending the markup language supported by the Web browser to include the new language tag, wherein the extending step further comprises:

the syntax processor using the extender to dynamically produce an operational DTD based upon the linking instructions, wherein said operational DTD is used by the Web browser in parsing a markup document that includes the new language tag;

wherein the identified extender further comprises a plurality of attributes, wherein said Web browser further comprises an extension loader for loading the extender at runtime, wherein the attributes of the extender define times at which the extension loader is to load the extender, wherein specifiable times via the attributes comprise at least two of "when the Web browser loads," "when a markup document is parsed," when a markup document is rendered," and when specified Document Object Model (DOM) events occur.

14. A browser comprising a computer program product tangibly stored in hardware, said computer program product being executable by computing equipment, said browser comprising:

a markup rendering processor that is a runtime processor that renders or interprets markup documents; and a syntax processor that is a Document Type Definition (DTD) processor, wherein said browser is operable to:

identify an extender comprising an extension module and linking instructions, wherein the extension module defines a new language tag that was not previously part of a markup language supported by the browser;

load the extender; and extend the markup language supported by the browser to include the new language tag, wherein the syntax processor uses the extender to dynamically produce an operational DTD based upon the linking instructions, wherein said operational DTD is used by the browser in parsing a markup document that includes the new language tag;

wherein the identified extender further comprises a plurality of attributes, wherein said Web browser further comprises an extension loader for loading the extender at runtime, wherein the attributes of the extender define times at which the extension loader is to load the extender, wherein specifiable times via the attributes comprise at least two of "when the Web browser loads," "when a markup document is parsed," when a markup document is rendered,"and when specified Document Object Model (DOM) events occur.

15. The browser of claim 14, further comprising:
a Document Object Model (DOM) processor for creating a new DOM event for the new language tag defined in the extender.

16. The browser of claim 14, wherein said browser is configured to load a plurality of different plug-in packages at approximately the same time, wherein each of the different plug-in packages includes at least one extension to the markup language supported by the browser that is specific to the plug-in package.

17. The browser of claim 14, wherein a plug-in framework of the browser provides for an ability for a definer to attach and execute code that extends the markup language where the attaching of code occurs at least two different times selected from a group consisting of a time when markup is parsed, a time when markup is rendered, and a time when Document Object Model (DOM) events occur.

18. The browser of claim 14, wherein said browser implements DOM event handling, and wherein said browser includes a step of adding an extension point defined by each of the plug-in packages as a Document Object Model (DOM) event.

* * * * *